United States Patent [19]
Saatweber et al.

[11] Patent Number: 5,569,384
[45] Date of Patent: Oct. 29, 1996

[54] PROCESS FOR RECOVERING THE OVERSPRAY OF AQUEOUS COATING AGENTS DURING SPRAY APPLICATION IN SPRAY BOOTHS

[75] Inventors: Dietrich Saatweber, Wuppertal; Friedrich L. Siever, Schwelm, both of Germany

[73] Assignee: Herberts GmbH

[21] Appl. No.: 148,182

[22] Filed: Nov. 5, 1993

Related U.S. Application Data

[63] Continuation of Ser. No. 27,823, Mar. 8, 1993, abandoned.

[30] Foreign Application Priority Data

Mar. 9, 1992 [DE]  Germany .................... 42 07 383.9

[51] Int. Cl.⁶ .................................................. B01D 61/20
[52] U.S. Cl. ........................................ 210/651; 210/195.2
[58] Field of Search ..................... 204/181.3; 210/650, 210/651, 195.2, 167

[56] References Cited

U.S. PATENT DOCUMENTS

| | | | |
|---|---|---|---|
| 3,663,402 | 5/1972 | Christenson et al. | 204/181 |
| 4,007,102 | 2/1977 | Springer et al. | 204/181.3 |
| 4,222,874 | 9/1980 | Connelly | 210/650 |
| 5,294,352 | 3/1994 | Waldmann | 210/725 |

*Primary Examiner*—Frank Spear
*Attorney, Agent, or Firm*—Schweitzer Cornman & Gross

[57] ABSTRACT

A process is described for recovering the overspray of aqueous coating agents during spray application in spray booths in which aqueous circulating liquid is circulated for the purpose of collecting the overspray. The overspray material is continuously or discontinuously extracted from the circulating liquid in an electrocoagulation bath, a higher concentration of overspray being maintained in the electrocoagulation bath than in the circulating liquid of the spray booth as a result of ultrafiltration.

10 Claims, 2 Drawing Sheets

PROCESS FOR RECOVERING THE OVERSPRAY OF AQUEOUS COATING AGENTS DURING SPRAY APPLICATION IN SPRAY BOOTHS

This is a continuation application of U.S. Ser. No. 08/027,823, filed on Mar. 8, 1993, now abandoned.

BACKGROUND OF THE INVENTION

The invention relates to a process for recovering the overspray of aqueous coating agents during spray application in spray booths, in which process the overspray can be recycled into the aqueous coating agent used in the spray booth.

The substitution of lacquers that are diluted with organic solvents by water-dilutable systems is becoming more and more important for well-known reasons of environmental protection. The use of water-dilutable systems results in the air being polluted to a lesser degree or even not at all as a result of solvent emissions. A general weakness when processing coating agents such as water-dilutable lacquers by spray application is presented, however, by problems resulting from the disposal of the overspray (lacquer mist); these problems arise in particular with large-scale series lacquering, in the automobile industry for example.

It is known how to cleanse the exhaust air of spray booths by washing out with water in order to get rid of the overspray. For example, in DE-A1-29 45 523 a process is described in which the overspray of conventional solvent-dilutable lacquers is washed out with water, whereupon the wash-water is subjected to ultrafiltration.

In DE-A1-32 27 22 a similar system is described for the disposal of the overspray accruing during lacquering with water-based lacquers.

SUMMARY OF THE PRESENT INVENTION

The overspray is absorbed on walls of the spray booth which are sprinkled with water and the sprinkling water which is circulated is treated by being passed through an ultrafilter. It has been shown, however, that the overspray collected in the sprinkling water is no longer suitable for further use in coating agents, so that it has to be disposed of. Although use is made of ultrafiltration in effluent purification and, in particular, in the removal of undesirable substances of low molecular weight in electrophoretic lacquering processes, thereby improving the yield as a result of recycling (DE-C2-21 58 668, DE-B2-22 29 677, EP-A1-0 127 685, EP-A1-0 137 877, U.S. Pat. No. 3,663,405 and U.S. Pat. No. 3,663,406), problems nonetheless arise with the use of ultrafiltration for the recycling of overspray. Whereas the ultrafiltration of electrophoretic lacquers has enabled the permeate and the retentate to be recycled into the bath material, as a result of the different manner of application (spraying instead of electrophoresis) and the greater differences in viscosity thereby involved, problems of stability arise in the recycling of overspray from water-based lacquers, such as the danger of coagulation, sedimentation, phase separation and the formation of deposits. In DE-A1-34 28 300 it is recommended to implement sprinkling of the spray booth with deionised water in order to avoid the stability problems arising with the process described in DE-A1-32 27 227. It has been shown, however, that even the use of deionised water as sprinkling liquid is not suitable for eliminating the stability problems of the absorbed overspray in such a way as to make it suitable to be re-used in the lacquering material. In WO 91/09666 it is attempted to solve the stability problems arising in accordance with the process described in DE-A1-32 276 227 by sprinkling the spray booth with water to which an agent for preventing coalescence has been added. In this connection use is made of amines. In so doing, not only are substances added which have an impact on the environment, the composition of the lacquer is also changed by the addition of chemicals.

Raising the concentration of overspray collected in water from low to relatively high concentrations by means of ultrafiltration leads moreover to pronounced changes in the aqueous coating agents, since ultrafiltration results, in particular, in the removal of water-soluble components and components of low molecular weight, such as solvents and neutralising agents, which contribute significantly to the stabilisation of the water-based lacquer dispersions and to their technical lacquering properties.

Dirk Saarbach and Georg Schlumpf in Oberfläche+JOT 1991, Issue 3, pages 18 to 20, "Die Naßlackierung ohne Emissionen oder Sondermüll" ("Wet lacquering without emissions or special waste") describe the lacquering of office furniture with recycling of water-based lacquer, whereby a continuous circulation is also described. It is mentioned that the constituent systems "water-dilutable stoving lacquer", "ultrafiltration technology" and "spraying plant" have to be attuned to one another. The input of additives to the recycling process is also described. But no reference is made as to how processing can be effected without incurring stability problems; moreover, the composition of the original lacquer is changed by the addition of the additives.

With the above-mentioned processes an additional problem arises if there is a frequent change of colour tone. Due to the change in colour tone a mixed colour tone results which can only be used for lacquering of secondary surfaces. This also applies to DE-C2-33 32 457, the patent following on from DE 32 27 227, in which it is disclosed that in order to bring about a change in colour tone the walls of the booth consist of rotatable segments.

The task was therefore to make available a process for recovering the overspray of aqueous coating agents, which process enables recycling of the overspray into the aqueous coating agent, even in the case of frequent change of colour tone, and which nevertheless enables high-quality and therefore mostly sensitive coating agents, such as aqueous industrial lacquers, especially automobile lacquers, to be used on a practical scale.

It has been shown that this task can be achieved in accordance with one object of the invention by means of a process for recovering the overspray of aqueous coating agents during spray application in spray booths in which aqueous circulating liquid is conveyed with a view to collecting the overspray, characterised in that the overspray material is extracted from the circulating liquid in an electrocoagulation bath, a higher concentration of overspray being maintained in the electrocoagulation bath than in the circulating liquid of the spray booth as a result of ultrafiltration.

DETAILED DESCRIPTION OF THE INVENTION

The process according to the invention is implemented in such a way that at least a part of the aqueous circulating liquid (booth circulating water or overspray washing liquid) is continuously or discontinuously withdrawn from the spray booth and fed into an electrocoagulation process. In the electrocoagulation treatment, circulating liquid containing overspray is conveyed to a bath from which the overspray is deposited at the anode or the cathode, depending on its nature. Deposition of this type may also be described as "electrophoretic deposition".

In this connection it has been shown within the scope of the invention that it is advantageous if the solids content of overspray in the circulating liquid of the booth is less than that of the portion of the circulating liquid of the booth which was subjected to electrocoagulation treatment.

According to the invention this differing solids content is achieved by intermediate or parallel connection of an ultrafiltration treatment stage.

It is advantageous if the circulating liquid of the booth has as low a solids content as possible, preferably at most 1.5% by weight, since with a higher solids content problems may arise with regard to the solids discharge given the required separation between ambient air and circulating liquid in the booth. On the other hand, it has been shown that in order to arrive at a product capable of being recycled with, for example, 20 to 95% solids content, starting from the circulating liquid of the booth containing, for example, 1.5% solids by weight, the ultrafiltration required with the process according to the invention is not excessive.

The process according to the invention is preferably carried out in such a way that the solids content of the circulating liquid of the booth in discontinuous and continuous operation amounts to not more than 1.5% by weight. The solids content preferably amounts to not more than 1.0% by weight.

The process according to the invention is preferably operated in such a way that the solids content of overspray in the electrocoagulation bath is maintained at around 5 to 15% by weight.

Circulating liquid in the spray booth is preferably deionized water.

The overspray deposited in the electrocoagulation bath at one electrode can be recycled for various applications. It is expedient for it to be resolubilised and processed into lacquer that is ready for spraying and which can be recycled again to the spray booth.

The overspray material obtained as a result of electrocoagulation may also, for example, be scraped off the electrode without being resolubilised. It maybe used optionally for another application (such as the production of other lacquers, those containing solvent for example, or the production of synthetic materials such as plastic plates).

The permeate obtained during ultrafiltration can, for example, be added to the circulating liquid of the booth.

According to a preferred embodiment, the invention consequently relates to a process for recovering the overspray of aqueous coating agents during spray application in spray booths, in which process the overspray is collected in an aqueous circulating or washing liquid. The circulating liquid, which may contain deionised water and up to, for example, 1.5% by weight of solids, is subjected to ultrafiltration. The permeate is recycled back into the spray booth as circulating liquid. The retentate, which for example contains 5–15% solids, is fed to an electrocoagulation cell (ECC) where electrodeposition and, optionally, resolubilisation of the overspray takes place. Thereafter the resolubilised overspray material, optionally after replenishment of individual components, can be fed either directly or after mixing with lacquer top-up concentrate to the spray booth as spray material or can be used in other types of application.

One disadvantage of the electrocoagulation process without ultrafiltration implemented in accordance with the invention for recycling water-based lacquer lies in its failure in the case of low solids content. With low solids contents of, e.g., about 1% by weight, the minimum deposition current density required for electrocoagulation is no longer achieved or it is so high that the process becomes uneconomic. In order to avoid problems with the solids discharge from the circulating water of the booth given the required separation of ambient air and circulating water in the booth, attempts are made, however, as described above, to obtain the lowest possible solids contents for the circulating liquids. The advantages of low concentration of the circulating liquid and application of electrocoagulation with high solids contents such as are appropriate are possible if the electrocoagulation is not carried out directly with aqueous circulating liquid of the booth or with booth water which has been enriched with overspray as a result of repeated circulation, but with a circulating liquid of the booth which has been enriched in solids content as a result of ultrafiltration. With this process the enrichment with solvent which may possibly occur in the aqueous circulating liquid can be controlled at the same time by discarding permeate. The permeate can also be used in part for the purpose of cleansing the electrocoagulated lacquer concentrate of adhering, non-coagulated dip film before it is removed from the discharge device and for recycling the latter directly into the coagulation bath.

A further advantage of the combination of ultrafiltration and electrocoagulation in accordance with the invention lies in the possibility of achieving a much higher solids content in comparison with the pure ultrafiltration process, since the throughput speed within the ultrafiltration units decreases sharply as solids content increases. With the commercially available water-based lacquers, ultrafiltration of liquids with a solids content of over 50% by weight is associated with uneconomically long processing-time or is no longer possible.

In accordance with the invention, ultrafiltration can be supported by reverse osmosis and/or hyperfiltration. These processes may be carried out in addition to ultrafiltration.

Ultrafiltration, reverse osmosis, and hyperfiltration are familiar to one skilled in the art. They can be implemented using conventional units. These filter processes are described both in the patent applications and patent specifications named in the descriptive introduction and, for example, by Wilhelm R. A. Auck and Hermann A. Müller in "Grundoperationen chemischer Verfahrenstechnik", Verlag Chemie, 1982, pages 153–155, by Robert Rautenbach and Rainer Albreit in "Grundlagen der chemischen Technik, Membrantrennverfahren, Ultrafiltration und Umkehrosmose", Otto Salle Verlag and Verlag Sauerländer, 1981, and by Thomas D. Brock in "Membrane Filtration", Springer Verlag, 1983.

High pressures are not required for the ultrafiltration stage of the process according to the invention. The minimum pressure necessary is that at which water and substance of low molecular weight are forced through the membranes at measurable speed. Such pressures lie, for example, in the range 0.7 to 11 bar, with an order of magnitude in particular of 5 bar.

The pressure for reverse osmosis is, by definition, greater than the osmotic pressure. There is no clear boundary between ultrafiltration and reverse osmosis or hyperfiltration. For the process according to the invention, reverse osmosis or hyperfiltration should be taken to mean, for example, filtration in which components of the permeate of low molecular weight are separated from the water to the greatest possible extent.

As a result of the possible use in the process according to the invention of reverse osmosis and of hyperfiltration aggregates, there is the additional advantage of including in the recycling process those water-soluble components which partially or wholly find their way into the permeate during ultrafiltration, such as water-soluble synthetic resins, e.g. polyvinyl alcohol, special water-soluble melamine resins, e.g. Cymel 327, the water-soluble portion of organic solvents or compounds of low molecular weight, such as described for example in the report by Dietrich Saatweber in "Untersuchung zum Einfluβ der Ultrafiltration auf die Eigenschaften von Elektrotauchlacken", VII, FATIPEC KONGRESS, Kongress-Buch pages 467–474. Possible changes in the relative masses of the components that do not get into the permeate and the components that do get into the permeate, e.g. in the event of unintentional loss of ultrafiltrate, can, in the case of re-use with a view to processing of the coating agents, optionally be balanced by suitable formulation of the top-up concentrate for the aqueous coating agents. But the components can also optionally be extracted from the permeate by reverse osmosis or hyperfiltration, as described above.

Electrocoagulation is practically an electrocoating of a depositable material which coagulates on anodes or cathodes of a circuit of direct current (Dr Fritz Beck "Zum Mechanismus der elektrophoretischen Lackierung", Farbe und Lack, 72nd year, No. 3, 1966, pages 218–224). In accordance with the invention, one or several electrodes are coated with lacquer material from the retentate of the ultrafiltered circulating water of the booth, said water containing overspray material in dispersed or dissolved form, in one or several intermediate basins equipped with suitable electrodes of a circuit of direct current. The deposited material can, for example, be transferred from the electrodes to a resolubilising basin and resolubilised by suitable neutralising agents or, optionally, auxiliary solvents and, optionally after replenishment of individual components, be fed to a suitable ultrafiltration circuit or directly to the spray booth as spray lacquer. But it can also be supplied to other applications or may be disposed of.

The deposition electrodes can, e.g., take the form of plates, disks, rollers or continuous bands.

Suitable for the process according to the invention are aqueous coating agents which contain neutralised binding agents or binding agents that are capable of being at least partly neutralised, such as anionic saturated polyester resins, polyurethane resins and/or acrylic polymers. In these cases, basic neutralising agents such as ammonia and amines are used for the purpose of resolubilisation after electrocoagulation. If cationic binding agents, which are deposited at the cathode, are present, acidic neutralising agents such as organic monocarboxylic acids—for example, formic acid, acetic acid, propionic acid and lactic acid—are used for resolubilising.

Auxiliary solvents may include conventional types, such as alcohols, glycol ethers and propylglycol ethers.

Additionally suitable for the process according to the invention are all aqueous dispersions and emulsions which can be deposited electrically and which can be removed from the electrode. For a recycling process in which the overspray is re-used, binding agents that are capable of being oxidised are often unsuitable. One skilled in the art can determine by means of preliminary tests in the laboratory whether the water-based lacquer is suitable for electrocoagulation and for resolubilisation by effecting an electrophoretic coating of the water-based lacquer diluted with deionised water to a solids content of 5 to 10% by weight. If the formation of an electrocoagulate is observed at the electrode, the specialist can test the usability of the coagulate for the desired process step within the scope of the process according to the invention. It is known to one skilled in the art that all lacquers capable of being diluted with water can be considered for electrocoagulation, including those which are not suitable for electrophoretic lacquering because they do not, for example, form usable, smooth, corrosion-proof or resistant films under the conditions of electrophoretic lacquering and subsequent crosslinking.

The process according to the invention can accordingly be carried out with such water-dilutable coating agents as are familiar to one skilled in the art and commercially available. Suitable are, for example, water-dilutable lacquers such as are used for mass-production lacquering in industry, including the automobile industry. Suitable are, for example, base lacquers capable of being diluted with water, pigmented and unpigmented topcoat lacquers such as are used in the automobile industry.

Necessary additives, such as anti-foam agents, additives for avoiding surface imperfections, flow-control additives, coalescence additives, may be added to the aqueous lacquers and dispersions or to the lacquer top-up concentrates or subsequently to the recycling circuits. Additives added subsequently may of course change the properties of the aqueous coating agent and may in some circumstances impair them.

The process according to the invention is preferably carried out using aqueous coating agents which have a solids content of 15 to 80% by weight.

The solids contents of aqueous coating agent and in the individual circuits can, for example, be determined in accordance with DIN 53216. In this connection it is preferred, after initial weighing of the sample to be determined, firstly to preheat it on a metal dish with a flat bottom for about half an hour at around 95° C. By this means a part of the water is evaporated and can no longer lead to false results as a result of splashing.

The coating agents capable of being diluted with water, for example water-dilutable lacquers and fillers, may optionally contain pigments and/or fillers, but they may also be formulated as clear lacquers. They may contain organic solvents or they may be free of organic solvents.

The water-dilutable coating agents that can be used for the process according to the invention may, as already mentioned, be transparent or pigmented. They may optionally contain fillers, additives such as anti-foam agents, coalescence agents, volatile organic liquids and other conventional raw materials used in lacquering. The systems may be self-crosslinking or externally crosslinking, for example for stoving lacquers.

The spray booths used in accordance with the invention are conventional spray booths. They can be operated with conventional circuits for incoming air and exhaust air. The usable spray booths can, for example, be equipped with at least one wet wall subject to sprinkling or with a Venturi washing system, such as is customary in particular in the lacquering of motor vehicles. Where use is made of wet walls subject to sprinkling, entire walls may take the form of wet walls. Such spray booths are familiar to one skilled in the art. The spray booths can optionally be provided with devices to prevent pigment sedimentation.

As a result of the present invention a process is made available which enables trouble-free practical recovery of overspray accruing during the spray application of aqueous coating agents. The process according to the invention is particularly suitable for use in the case of manual, automatic, or electrostatic spray application, such as is carried out in particular in mass-production lacquering. It enables environmentally-protective recovery of virtually 100% of overspray.

The process can be implemented both discontinuously and continuously.

DESCRIPTION OF THE DRAWINGS

Two examples of the processing method in accordance with the invention are given below with reference to the attached diagrams.

EXAMPLE OF DISCONTINUOUS EMBODIMENT OF THE PROCESS

Figure 1:
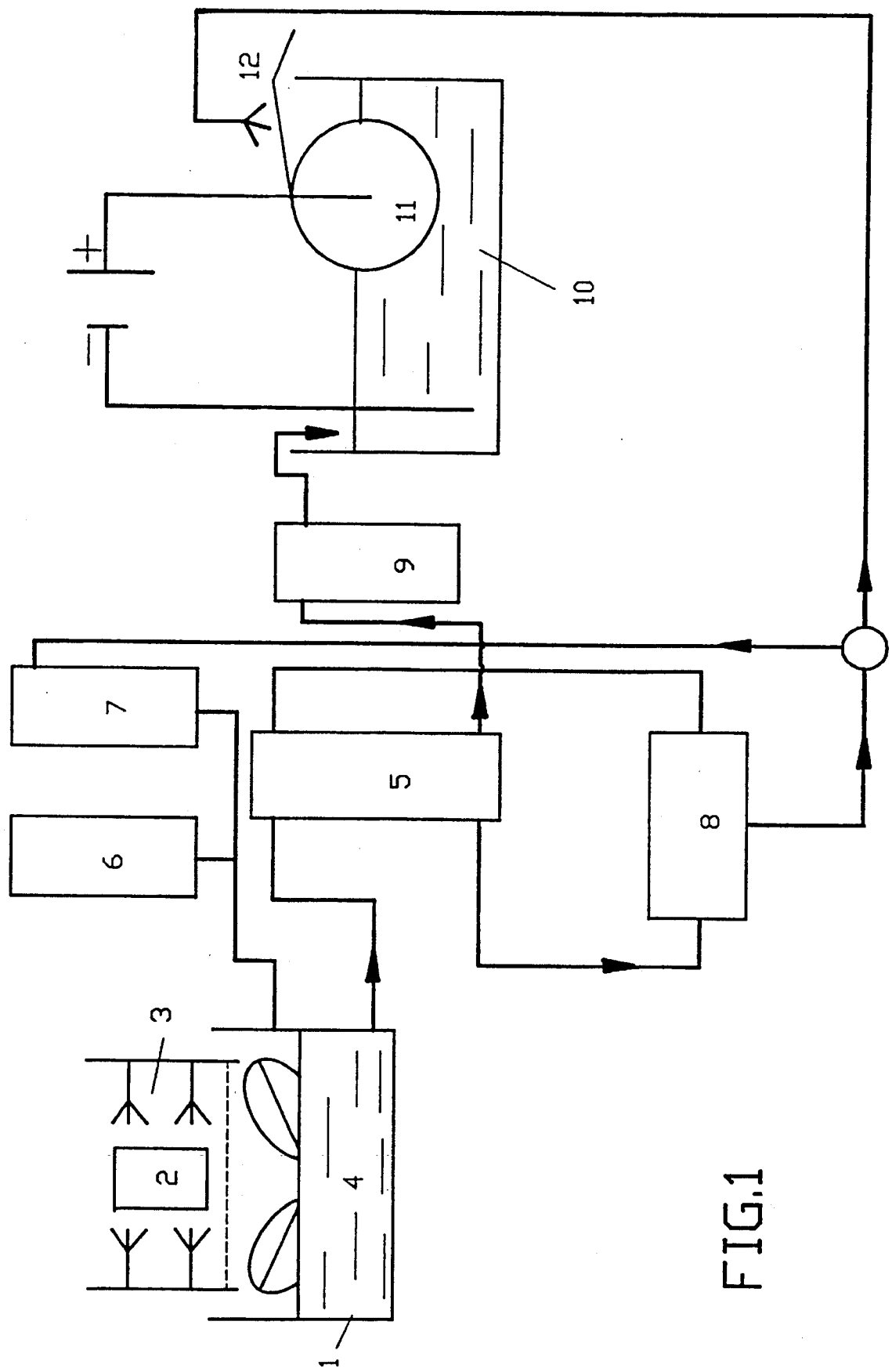
FIG. 1 represents an example of a discontinuous embodiment of the process according to the invention and FIG. 2 represents an example of a continuous embodiment.

With the embodiment of FIG. 1 an object 2 to be lacquered is sprayed in a spray booth 1 by spray devices 3; the overspray obtained is captured in the circulating liquid 4 of the booth and collected on the floor of the spray booth. In this connection the process is effected in the spray booth in such a way that the overspray in the circulating liquid of the booth is concentrated up to 1.5% by weight (15 kg/m$^3$).

Thereafter the charged circulating liquid is received into a storage container 5 and the booth circulating system is topped up with deionised water, permeate or a mixture of both from containers 6 and 7 by way of booth circulating liquid.

The booth circulating liquid from storage container 5 is fed in a circuit through an ultrafiltration unit 8 and concentrated until the solids content of the overspray amounts to, for example, 5–10% by weight. In this connection the permeate is collected in container 7 for re-use as fresh circulating liquid either on its own or mixed with water.

The retentate obtained during ultrafiltration is transferred, directly or via a buffer container 9, into an electrocoagulation cell 10.

In electrocoagulation cell 10 the solid substance in the present example is deposited at the anode. In the present example the anode takes the form of a roll 11 and is provided with a stripping or scraping device and washing device 12 with which the adhering dip film can, for example, be washed off with permeate. The volume and the solids content in the electrocoagulation cell can be controlled by means of supply from buffer container 9, optionally also by a drain in the storage container 5 for circulating liquid of the booth, with a view to further filtration.

With the process according to the invention it is generally possible to provide the electrocoagulation cell with a device for electrodialysis, said device being suitable for removing, wholly or partially, any possible amine content from the liquid which is to be purified.

In addition it is generally possible with the process according to the invention to add biocides to the coating agent or aqueous lacquer or the circuits with a view to avoiding undesirable biological effects.

EXAMPLE OF CONTINUOUS EMBODIMENT OF THE PROCESS

Figure 2:
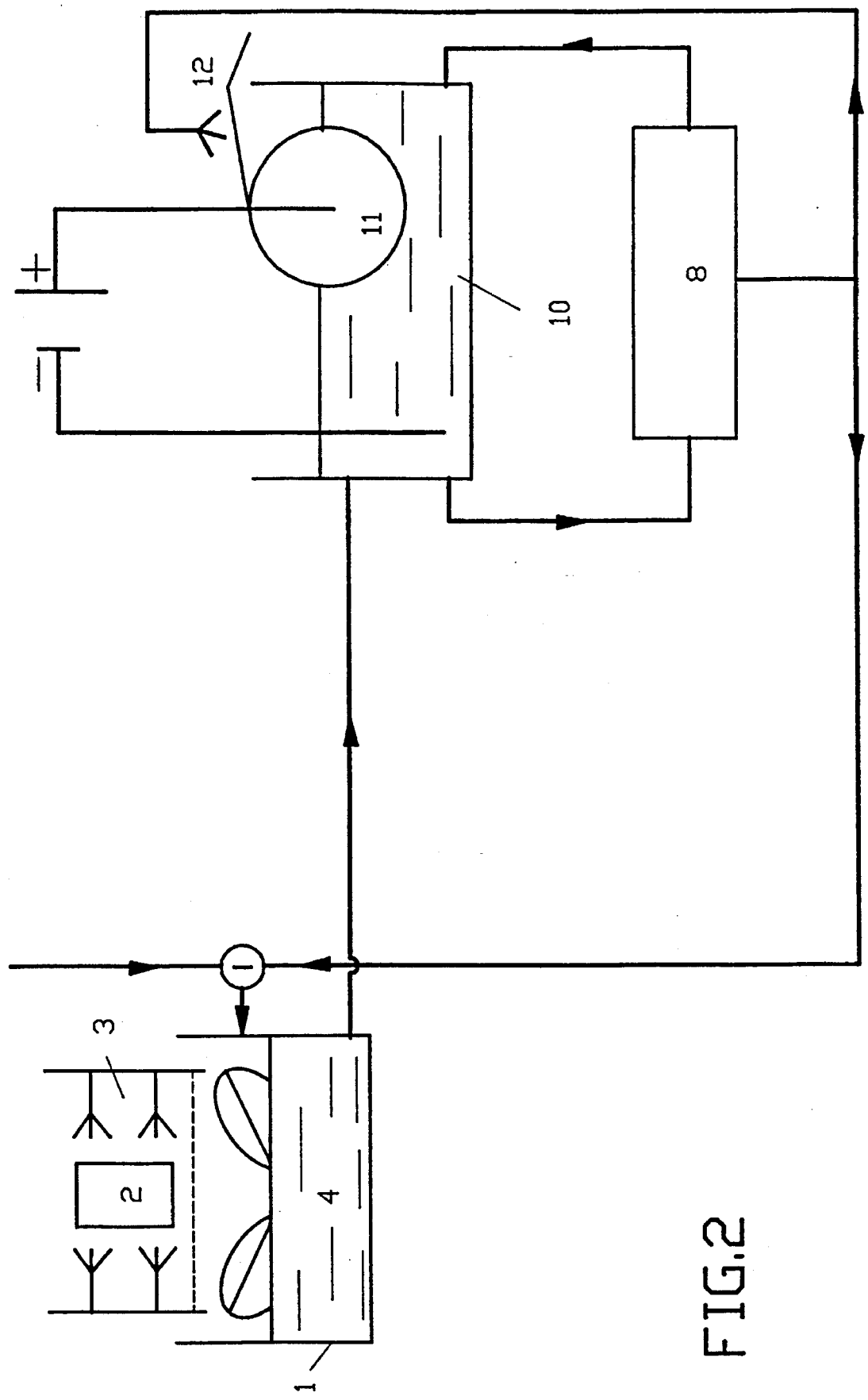

In FIG. 2 a further example of an embodiment according to the invention is indicated, this being an example which works continuously. In a spray booth 1 an object 2 to be lacquered is lacquered with spray devices 3; the overspray is collected in the circulating liquid 4. The solids content of this liquid is maintained approximately constant, for example at around 1% by weight of overspray solids. While overspray is collected by the circulating liquid, circulating liquid is continuously withdrawn at the same rate, and the volume is kept constant by the supply of permeate, deionised water or a mixture of permeate and deionised water. The charged circulating liquid of the booth is fed directly or via a buffer container to electrocoagulation cell 10. Connected to the electrocoagulation cell is an ultrafiltration unit 8. This is operated continuously, and it withdraws as much permeate in a given unit of time as is supplied in circulating water, as well as, optionally, an additional amount which is needed for washing the electrocoagulated material from anode 11 by means of stripping or washing device 12.

The electrocoagulation cell deposits per unit as much solid matter of the coating agent or lacquer as is supplied to it via the circulating water.

The permeate obtained can be fed directly or via a buffer container, wholly or partially in a mixture with water, to the circulating liquid of the booth in order to replenish the volume.

Also in the present example it is possible to bring about the general working method of amine discharge from the electrocoagulation cell by means of electrodialysis.

With the process according to the invention it is possible to recover oversprays from aqueous coating agents. The recovered oversprays can be recycled to aqueous coating agents. Recycling for another lacquer or another product in a state which is largely water-free and solvent-free is also possible in the case of frequent changes of colour tone in the spray booth. Problems of lacquer stability and discharge of solids from the system are largely avoided. As a result of the processing method according to the invention, the use of high-quality and consequently mostly sensitive coating agents, such as aqueous industrial lacquers and, especially, aqueous automobile lacquers, is made possible on a practical scale. A further advantage of the process according to the invention is the possibility of continuous or discontinuous implementation.

We claim:

1. Process for recovering the overspray of aqueous coating agents during spray application in spray booths in which aqueous circulating liquid is circulated for the purpose of collecting the overspray, characterised in that the overspray material is extracted from the circulating liquid in an electrocoagulation bath, a higher concentration of overspray being maintained in the electrocoagulation bath than in the circulating liquid of the spray booth as a result of ultrafiltration.

2. Process according to claim 1, characterised in that the solids concentration of overspray is maintained at up to 1.5% by weight in the circulating liquid of the spray booth and at 5 to 15% by weight in the electrocoagulation bath by means of ultrafiltration.

3. Process according to claim 1, characterised in that electrocoagulation of the circulating liquid of the spray booth is implemented discontinuously.

4. Process according to claim 1, characterised in that a part of the circulating liquid of the spray booth is continuously subject to ultrafiltration and electrocoagulation treatment.

5. Process according to claim 1, characterised in that the overspray material deposited at an anode or cathode during the electrocoagulation treatment is removed from the anode or cathode and is recycled to be used for spray application in the spray booth.

6. Process according to claim 1, characterised in that the permeate of the circulating liquid obtained during ultrafiltration is conveyed to the spray booth.

7. Process according to claim 1, characterised in that the overspray deposited during the electrocoagulation treatment is recycled without being resolubilised in water.

8. The process of claim 5 wherein the overspray material removed from the anode or cathode is first reprocessed before being recycled for use in the spray application.

9. The process of claim 6 wherein the permeate of the circulating liquid is mixed with water before being conveyed to the spray booth.

10. The process of claim 1 wherein the aqueous coating agent is a water-dilutable lacquer.

\* \* \* \* \*

UNITED STATES PATENT AND TRADEMARK OFFICE
CERTIFICATE OF CORRECTION

PATENT NO. : 5,569,384
DATED : Oct. 29, 1996
INVENTOR(S) : Dietrich Saatweber; Friedrich L. Siever It is certified that error appears in the above-identified patent and that said Letters Patent is hereby corrected as shown below:

Column 1, line 33, change "DE-A1-32 27 22" to --DE-A1-32 27 227--.

Signed and Sealed this

Sixth Day of May, 1997

Attest:

BRUCE LEHMAN

Attesting Officer

Commissioner of Patents and Trademarks